US011675549B2

(12) United States Patent
Yano

(10) Patent No.: US 11,675,549 B2
(45) Date of Patent: Jun. 13, 2023

(54) PRINT CONTROL APPARATUS, PRINT CONTROL METHOD, AND STORAGE MEDIUM

(71) Applicant: CANON KABUSHIKI KAISHA, Tokyo (JP)

(72) Inventor: Yukiteru Yano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/701,002

(22) Filed: Mar. 22, 2022

(65) Prior Publication Data

US 2022/0308807 A1    Sep. 29, 2022

(30) Foreign Application Priority Data

Mar. 26, 2021    (JP) .............................. JP2021-053342

(51) Int. Cl.
| | | |
|---|---|---|
| *G06F 3/12* | (2006.01) | |
| *G06T 7/64* | (2017.01) | |
| *G06V 40/16* | (2022.01) | |
| *B41J 2/21* | (2006.01) | |
| *G06K 15/02* | (2006.01) | |

(52) U.S. Cl.
CPC .......... *G06F 3/1208* (2013.01); *B41J 2/2114* (2013.01); *G06F 3/1253* (2013.01); *G06K 15/028* (2013.01); *G06T 7/64* (2017.01); *G06V 40/161* (2022.01); *G06T 2207/30201* (2013.01)

(58) Field of Classification Search
CPC ..... G06F 3/1208; G06F 3/1253; B41J 2/2114; B41J 2202/31; B41J 2/2054; B41J 2/325; B41J 29/00; B41J 2/32; B41J 29/393; G06K 15/028; G06K 15/188; G06T 7/64; G06T 2207/30201; G06T 2207/20012; G06T 7/12; G06V 40/161; G06V 10/98; B41M 7/0036
USPC ........................................................ 358/1.8
See application file for complete search history.

(56) References Cited

U.S. PATENT DOCUMENTS

| | | |
|---|---|---|
| 5,550,099 A | 8/1996 | Ohshima |
| 10,277,756 B2 | 4/2019 | Spence |
| 10,857,829 B2 | 12/2020 | Maehira |
| 2007/0013759 A1 | 1/2007 | Kadomatsu |

(Continued)

FOREIGN PATENT DOCUMENTS

| | | |
|---|---|---|
| JP | 2005 225135 A | 8/2005 |
| JP | 2009073034 A | 4/2009 |
| JP | 5090516 B2 | 12/2012 |

*Primary Examiner* — Darryl V Dottin
(74) *Attorney, Agent, or Firm* — Canon U.S.A., Inc. IP Division

(57) ABSTRACT

A print control apparatus is configured to transfer transparent protective ink onto an image printed on a substrate. The print control apparatus includes an extraction unit configured to extract a contour of a subject in the image, and a control unit configured to generate print data for transferring the protective ink using a printing apparatus, based on the extracted contour of the subject. The control unit generates the print data by assigning a high gradation value to a contour line corresponding to the extracted contour of the subject, assigning a low gradation value to a region corresponding to the subject, and assigning a mixture of the high gradation value and the low gradation value to an outer peripheral region of the subject.

15 Claims, 13 Drawing Sheets

(56) References Cited

U.S. PATENT DOCUMENTS

| | | | |
|---|---|---|---|
| 2011/0316981 A1* | 12/2011 | Iwabuchi | G06T 7/571 |
| | | | 348/49 |
| 2012/0293593 A1 | 11/2012 | Kondo | |
| 2013/0329991 A1* | 12/2013 | Nashizawa | H04N 1/6027 |
| | | | 382/165 |
| 2014/0232783 A1 | 8/2014 | Del Rio | |
| 2020/0055082 A1 | 2/2020 | Schlatterbeck | |

* cited by examiner

PRINT CONTROL APPARATUS, PRINT CONTROL METHOD, AND STORAGE MEDIUM

BACKGROUND OF THE INVENTION

Field of the Invention

The present invention relates to a print control apparatus, a print control method, and a storage medium for transferring transparent protective ink, such as an overcoat, onto an image.

Description of the Related Art

The recent advancement of image processing techniques has made it possible to easily take pictures with a bokeh effect, which are generally called portraits, using a digital camera or a smartphone without using an expensive telescopic single focus lens in particular.

Sublimation thermal transfer type image forming apparatuses capable of photographically printing an image captured by a digital still camera or a smartphone have been known. The sublimation thermal transfer type refers to a method of pressing a heated thermal head against an ink ribbon to sublimate ink from solid to gas and making the ink adhere to photographic paper. Inks are arranged on the ink ribbon in the form of yellow (Y), magenta (M), and cyan (C) sublimation dye layers and an overcoat (OC) layer. An image formed using the YMC sublimation dye layers (the YMC sublimation dye inks) is protected by the colorless transparent OC layer (the transparent OC ink) to provide a highly durable, waterproof finish.

The OC layer not only has the function of protecting a photographic print product, but also is used for various applications. Special effects can be obtained by changing the amount of heat to be applied to control the surface shape of the protective layer and change reflectance.

Japanese Patent Application Laid-Open No. 2009-73034 discusses a technique for recording user-requested information in a photographic print product by changing the transfer amount of the OC ink. Text and graphic information can be expressed by using the colorless transparent OC layer. Printing using the transparent OC layer is less discernible and thus has the advantage of being less likely to affect the photographically printed image therebelow.

It is desirable that an image captured as a portrait should provide a beautiful bokeh effect so that the main subject such as a person or a still object appears clearly and sharply and the background is out of focus.

SUMMARY OF THE INVENTION

The present invention is directed to enhancing an effect of a sharply contrasted picture such as a portrait to obtain a more expressive picture by changing the transfer amount of transparent protective ink, such as an overcoat (OC) ink, to control surface properties. In other words, the present invention is directed to providing a print control apparatus and a print control method capable of printing that provides different surface properties for the subject, such as a person or a still object, and the surrounding background by transferring transparent protective ink, such as an OC ink, differently to control the surface properties.

According to an aspect of the present invention, a print control apparatus for transferring transparent protective ink onto an image printed on a substrate includes a memory and at least one processor which function as an extraction unit configured to extract a contour of a subject in the image, and a control unit configured to generate print data for transferring the protective ink using a printing apparatus, based on the extracted contour of the subject. The control unit is configured to generate the print data by assigning a high gradation value to a contour line corresponding to the extracted contour of the subject, assigning a low gradation value to a region corresponding to the subject, and assigning a mixture of the high gradation value and the low gradation value to an outer peripheral region of the subject.

An aspect of the present invention provides a print control apparatus and a print control method capable of printing that provides different surface properties for the subject, such as a person or a still object, and the surrounding background by transferring transparent protective ink, such as an OC ink, differently to control the surface properties.

Further features of the present invention will become apparent from the following description of embodiments with reference to the attached drawings.

DESCRIPTION OF THE EMBODIMENTS

Embodiments of the present invention will be described in detail below with reference to the drawings.

In the following description, "printing" refers to an entire series of processes and operations from photographic printing based on a print instruction from a user to printout discharge. "Photographic printing" refers to, among the series of processes and operations, the process and operation for forming an image on a substrate such as a recording sheet by thermally transferring a transfer material (an ink or an overcoat) applied to an ink sheet (an ink ribbon) onto the recording sheet.

Figure 1:
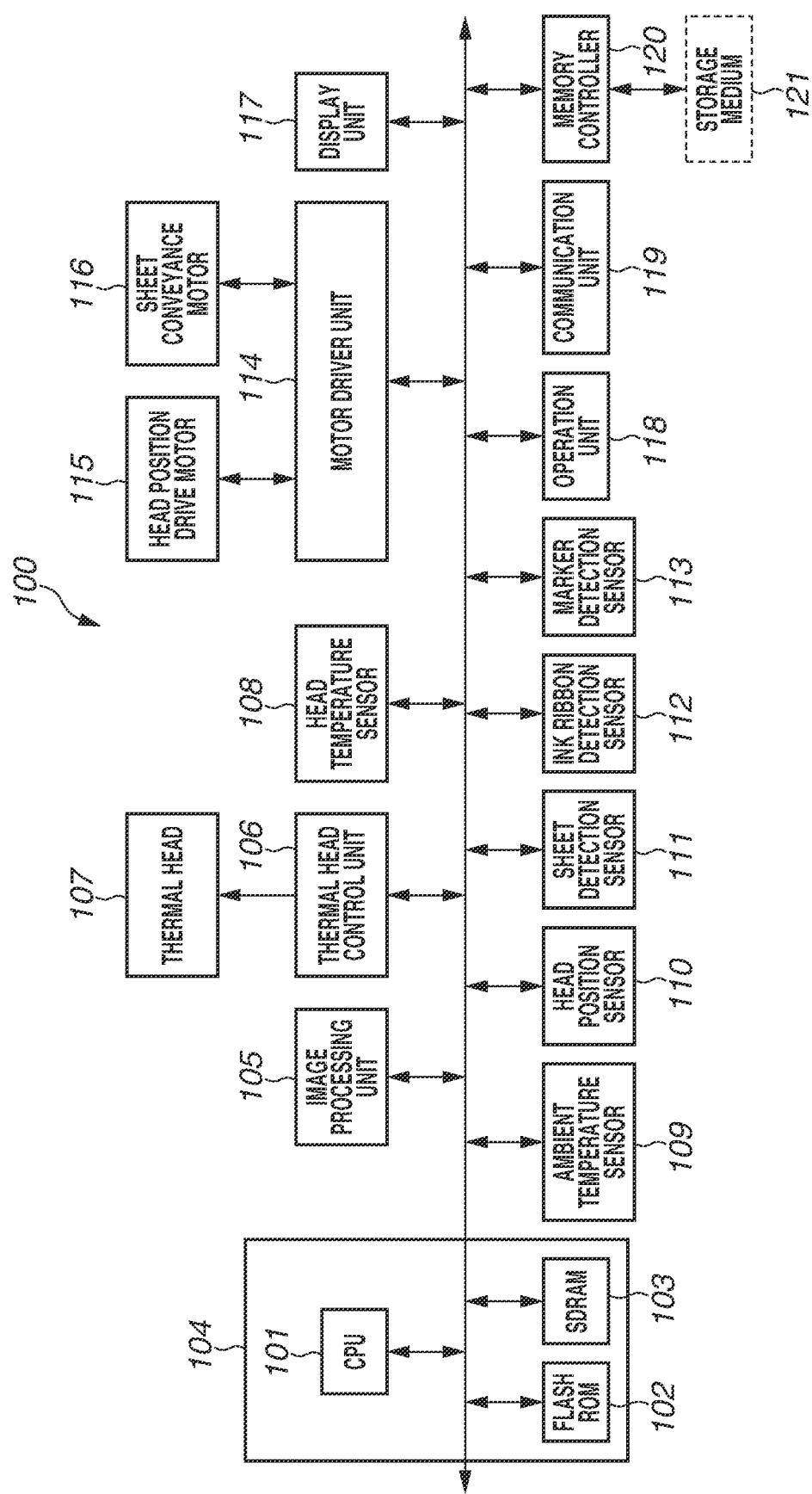
FIG. 1 a block diagram of a printer.

FIG. 1 is a block diagram of a thermal transfer type printer (a printing apparatus or a print control apparatus) 100 according to an embodiment of the present invention. A central processing unit (CPU) 101 performs system control and calculation processing of the printer 100. A flash read-only memory (ROM) 102 stores a system control program of the printer 100. The CPU 101 reads a program from the flash ROM 102 and controls various components based on the read program. A synchronous dynamic random access memory (SDRAM) 103 temporarily stores image data and is used for data processing operations. The CPU 101, the flash ROM 102, and the SDRAM 103 constitute a main control unit 104 that mainly processes various types of control of the printer 100. Functions and processing of the printer 100 to be described below are implemented by the CPU 101 reading a program stored in the flash ROM 102 and executing the program. An image processing unit 105 performs image processing on image data transmitted from a digital camera or a portable terminal, and image data read from a storage medium 121. The image processing unit 105 performs various types of image processing on image data and generates, based on the processed image data, print data for photographic printing. Examples of the image processing include decompression processing on compressed image data, resize processing based on paper to be used, and image correction processing.

The image processing unit 105 according to the present embodiment is characterized by performing processing related to image data generation for an overcoat (OC) layer. The printer 100 according to the present embodiment particularly has a special mode called main subject emphasis mode. In a case where the main subject emphasis mode is selected, the image processing unit 105 selects a specific range in the image data and performs contour extraction in the specific range. Based on a result of the extraction, the image processing unit 105 generates photographic print data to be applied to the OC layer. Details thereof will be described below with reference to FIGS. 6 to 13.

As another example, the processing of the image processing unit 105 may be performed by the main control unit 104 instead of the image processing unit 105, or the image processing unit 105 and the main control unit 104 may perform the processing together.

A thermal head control unit 106 converts the print data generated by the image processing unit 105 into an electrical signal and outputs the electrical signal to a thermal head 107. The thermal head 107 transforms the electrical signal into thermal energy and transfers dye from an ink ribbon 300 (see FIG. 3) to a sheet.

A head temperature sensor 108 measures a temperature of the thermal head 107. An ambient temperature sensor 109 measures an ambient temperature in the printer 100. A head position sensor 110 detects a position of the thermal head 107, such as a pressing position or a retracted position. A sheet detection sensor 111 detects a position of a sheet. An ink ribbon detection sensor 112 detects information about the ink ribbon 300. A marker detection sensor 113 detects markers disposed on the ink ribbon 300.

A motor driver unit 114 controls motors. A head position drive motor 115 is used to drive the thermal head 107 to the pressing position for performing the photographic printing or the retracted position for replacing an ink ribbon cassette 200 (see FIG. 2) or conveying a sheet. A sheet conveyance motor 116 is used to convey the sheet. The main control unit 104 issues commands to the motor driver unit 114 to control driving of the head position drive motor 115 and the sheet conveyance motor 116, based on sensor information from the foregoing various sensors and information programmed in advance.

A display unit 117 displays an image stored in the storage medium 121 and an operation menu of the printer 100. An example of the display unit 117 is a liquid crystal display (LCD). An operation unit 118 is used to input instructions from the user. A communication unit 119 controls communication with an external device, such as a digital camera, connected to the printer 100. A memory controller 120 reads or writes image data from or to the storage medium 121 attached to the printer 100. The storage medium 121 stores image data and is detachably attached to the printer 100.

Figure 2:
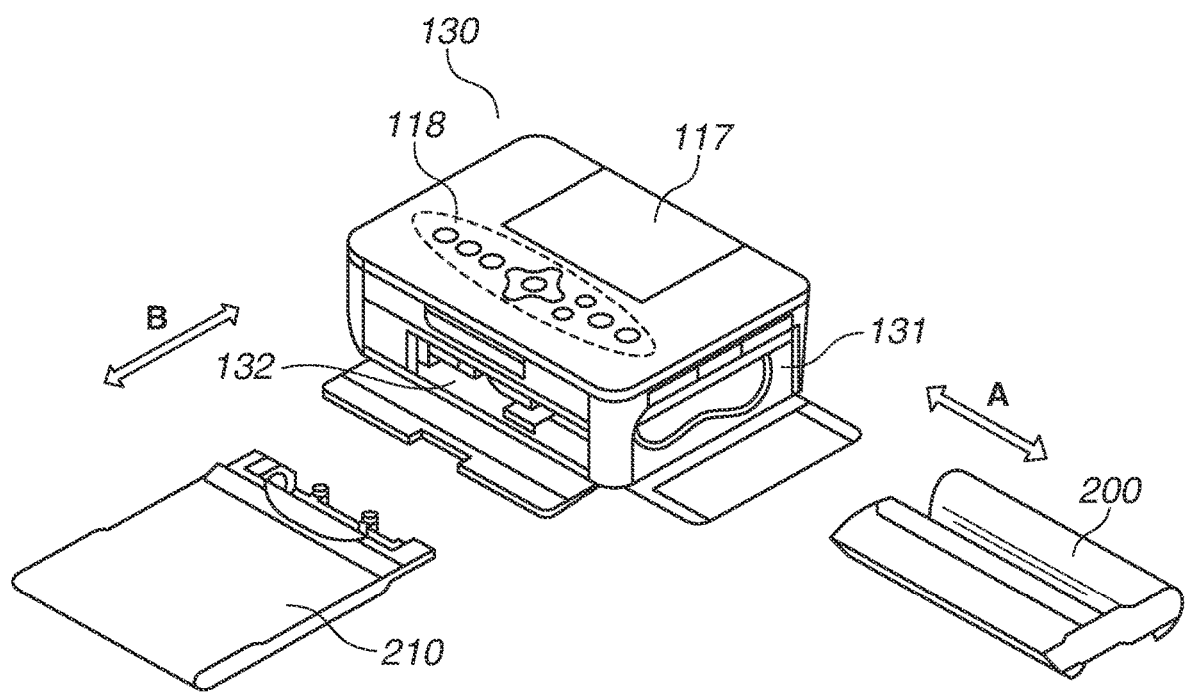
FIG. 2 is an external view of the printer and an ink ribbon cassette.

FIG. 2 is an external view of the printer 100 and the ink ribbon cassette 200. On a side of a printer main body 130, an ink ribbon cassette slot 131 into which the ink ribbon cassette 200 can be inserted is provided, and the ink ribbon cassette 200 is attachable and detachable in a direction indicated by an arrow A. On a front side of the printer main body 130, a sheet tray slot 132 into which a sheet tray 210 can be inserted is provided. The sheet tray 210 is attachable and detachable in a direction indicated by an arrow B.

The display unit 117 and the operation unit 118 are disposed on a top side of the printer main body 130. The user can view images and image processing information displayed on the display unit 117 and select an image to be photographically printed by operating the operation unit 118. In response to the instruction from the user, the printer 100 can process the image as appropriate and photographically print the image.

Figure 3:
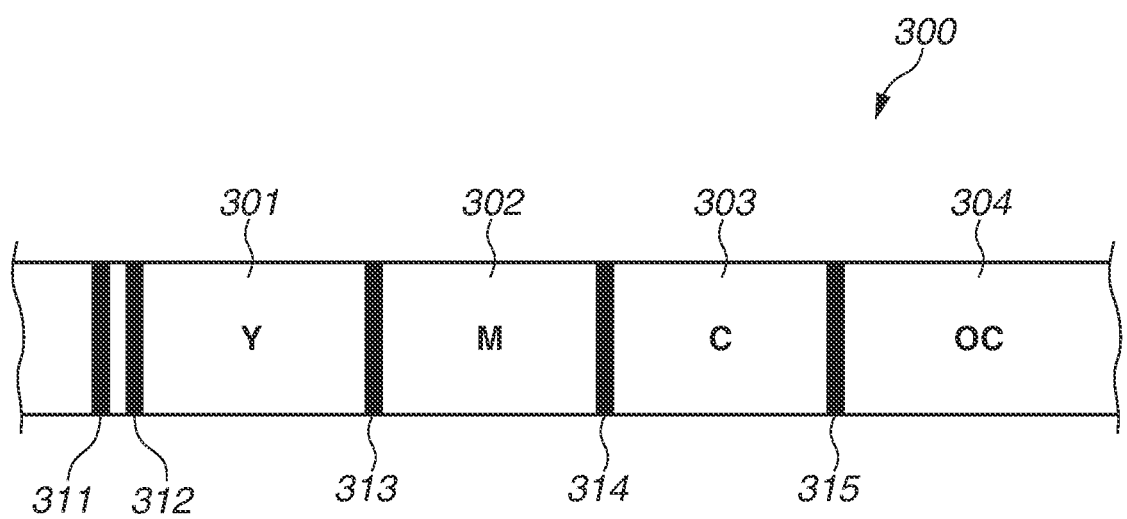
FIG. 3 is a plan view of an ink ribbon.

FIG. 3 is a plan view of the ink ribbon 300. The ink ribbon 300 includes three color ink layers, namely, a yellow (Y) layer 301, a magenta (M) layer 302, and a cyan (C) layer 303 applied to a base film surface. The plurality of color ink layers (the Y layer 301, the M layer 302, and the C layer 303) is arranged on the ink ribbon 300. The ink ribbon 300 further includes an OC layer 304 applied to the base film surface, following the Y layer 301, the M layer 302, and the C layer 303. The OC layer 304 is formed of transparent protective ink for protecting an image printed on a sheet using the color inks of the Y layer 301, the M layer 302, and the C layer 303. Transferring the protective ink of the OC layer 304 onto the image can protect the image and provide a highly durable, waterproof finish.

Markers 311 to 315 for layer delimitation and cueing are applied between the YMC layers 301 to 303, between the C layer 303 and the OC layer 304, and between the OC layer 304 and the Y layer 301. The Y layer 301 at the beginning of each ink group is preceded by the two markers 311 and 312. Each of the other boundaries between the layers is provided with one of the markers 313 to 315.

When the photographic printing is started, the main control unit 104 first controls take-up driving of the ink ribbon 300 to detect the Y layer 301 at the beginning of the ink group. After detecting the marker 311, the main control unit 104 performs control to further take up the ink ribbon 300 to a position where the second marker (the marker 312) is supposed to be detected. When detecting the marker 312, the main control unit 104 determines the beginning of the ink group.

The marker detection sensor 113 according to the present embodiment is a reflection infrared sensor. The dyes in the YMC layers 301, 302, and 303 for normal use and the coating agent in the OC layer 304 do not absorb infrared radiation having an emission wavelength of approximately 900 to 1000 nm. Since the infrared radiation transmits through the ink sheet (the ink ribbon 300) regardless of hue, use of infrared blocking markers enables detection of the boundaries between the ink portions and the markers. The markers can be formed by containing an infrared blocking material.

Figure 4A:
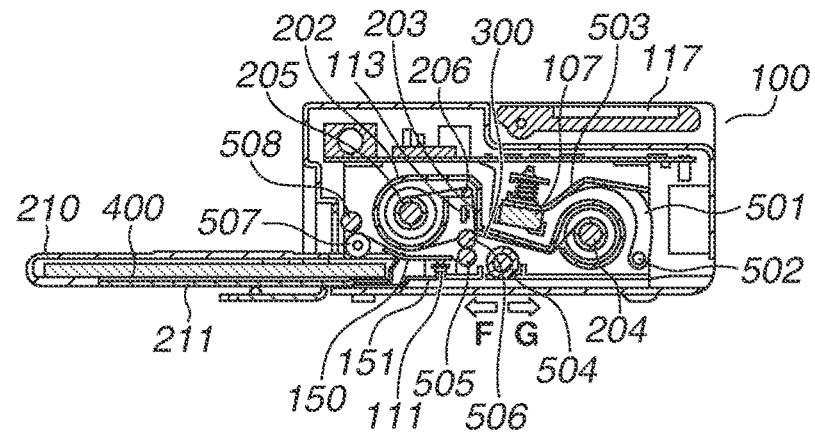
FIGS. 4A to 4E are sectional side views of the printer.
Figure 4B:
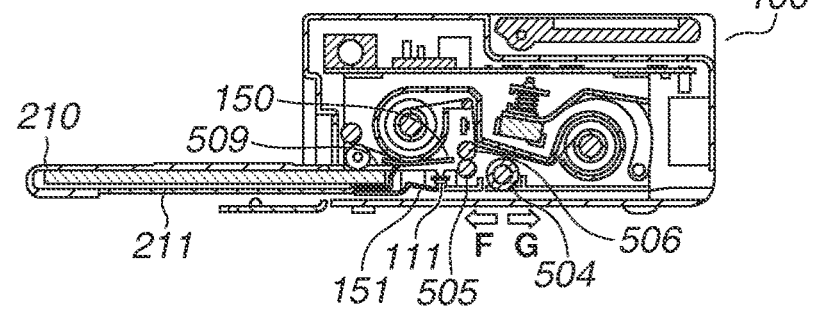
Figure 4C:
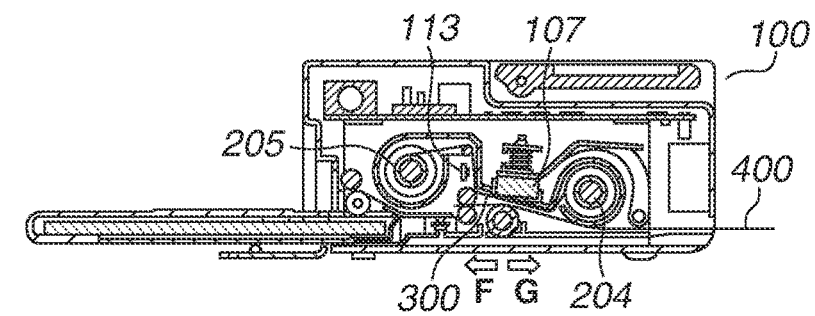
Figure 4D:
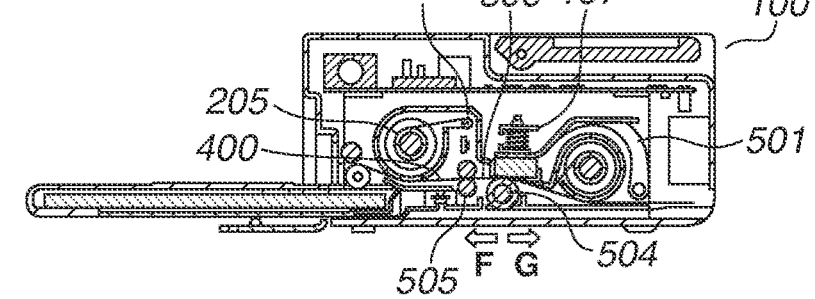
Figure 4E:
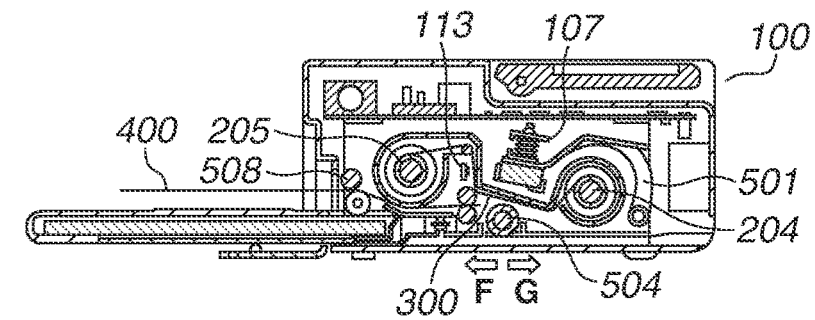

FIGS. 4A to 4E are sectional side views of the printer 100. A mechanical configuration of the printer 100 and basic operations related to the photographic printing will be described with reference to FIGS. 4A to 4E. FIG. 4A illustrates the printer 100 in a standby state. FIG. 4B illustrates the printer 100 during sheet feeding. FIG. 4C illustrates the printer 100 before start of the photographic printing. FIG. 4D illustrates the printer 100 during the photographic printing. FIG. 4E illustrates the printer 100 during sheet discharge. The thermal head 107 is illustrated in FIGS. 4A to 4E. A thermal head support arm 501, a heat radiation plate 503, and a platen roller 504 are also illustrated in FIGS. 4A to 4E. The thermal head support arm 501 is rotatably supported about a rotation shaft 502.

The thermal head 107 is fixed to the thermal head support arm 501. Accordingly, the thermal head 107 is movable from a first retracted position illustrated in FIG. 4A to a second retracted position illustrated in FIG. 4C and from the second retracted position to a pressing position illustrated in FIG. 4D, so that the thermal head 107 and the platen roller 504 can produce a pressure contact force therebetween. The heat radiation plate 503 is attached to the thermal head 107 and is configured to transfer heat generated by the thermal head 107 to the heat radiation plate 503. The platen roller 504 is rotatably disposed on the printer main body 130 and is configured to rotate with the conveyance of each sheet 400.

A conveyance roller 505 is configured to be driven to rotate by a sheet conveyance motor (not illustrated). A driven roller 506 is opposed to the conveyance roller 505 and is configured to rotate by the rotation of the conveyance roller 505. A sheet feed roller 507 is configured to be driven to rotate by a sheet feed drive motor (not illustrated). A sheet discharge roller 508 is a driven roller opposed to the sheet feed roller 507 and is configured to rotate by the rotation of the sheet feed roller 507.

A reflective sticker 203 is attached to a case 202 of the ink ribbon cassette 200 at a position opposed to the marker detection sensor 113 where the ink ribbon 300 is between the marker detection sensor 113 and the reflective sticker 203. Infrared radiation from the marker detection sensor 113 transmits through the ink ribbon 300, is reflected by the reflective sticker 203, transmits through the ink ribbon 300 again, and is incident on a light receiving portion of the marker detection sensor 113.

A sheet guide 150 is supported so that, during sheet feeding, the sheet guide 150 is raised by the sheet 400 and is rotatable from a position illustrated in FIG. 4A to a position illustrated in FIG. 4B. The sheet guide 150 is constantly urged downward and located at the position illustrated in FIG. 4A except during sheet feeding. A pressing plate 151 is driven to rotate by a driving source (not illustrated) and is configured to be rotatable from a position illustrated in FIG. 4A to a position illustrated in FIG. 4B. When the pressing plate 151 is driven to the position illustrated in FIG. 4B, a lift plate 211 rotatably supported inside the sheet tray 210 is lifted up to press the uppermost one of the sheets 400 stored in the sheet tray 210 against the sheet feed roller 507. This enables sheet feeding. The sheet detection sensor 111 is provided below the sheet guide 150.

Figure 5:
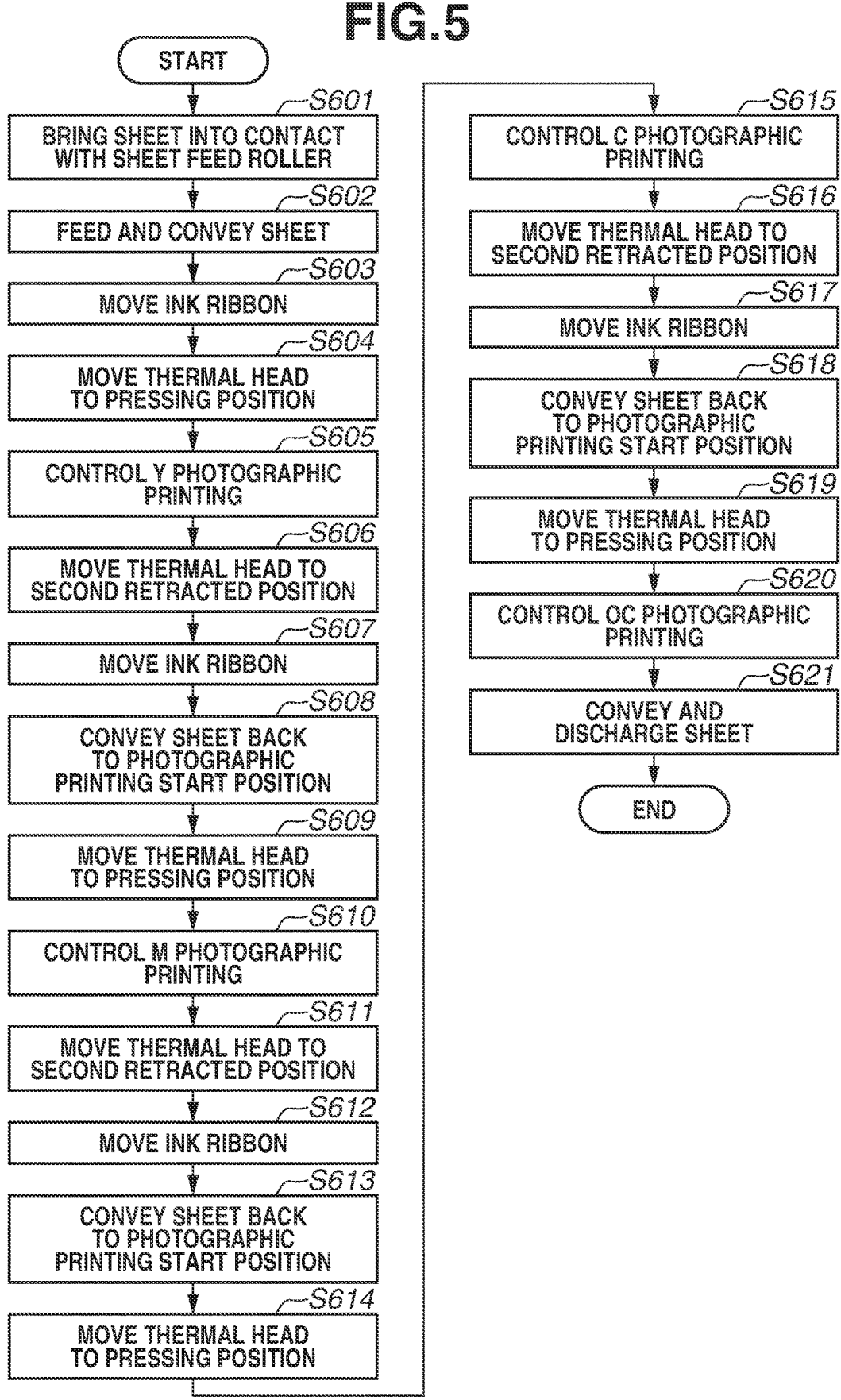
FIG. 5 is a flowchart illustrating normal photographic print processing by the printer.

FIG. 5 is a flowchart illustrating normal photographic print processing by the printer 100. The normal photographic print processing refers to processing in which information specified as a photographic print target is printed and accompanying information is not printed. An image specified as the photographic print target, i.e., an image to be printed will be hereinafter referred to as a target image. When the ink ribbon cassette 200 is inserted into the ink ribbon cassette slot 131 of the printer main body 130 as illustrated in FIG. 2, a rotation restriction unit (not illustrated) between a supply bobbin 204 and a take-up bobbin 205 is disengaged from the case 202 of the ink ribbon cassette 200. This enables the supply bobbin 204 and the take-up bobbin 205 to be driven to rotate by a rotation drive mechanism provided in the printer main body 130. Inserting the sheet tray 210 into the sheet tray slot 132 of the printer main body 130 enables feeding of the sheets 400. When the main control unit 104 receives a photographic print instruction from the user via the operation unit 118, in a state of the ink ribbon cassette 200 and the sheet tray 210 being inserted and in a state of readiness for the photographic printing, the main control unit 104 starts the normal photographic print processing. In step S601, the main control unit 104 performs control to bring the sheets 400 into contact with the sheet feed roller 507. As illustrated in FIG. 4B, the pressing plate 151 is driven to rotate by the driving source (not illustrated) under control of the main control unit 104, so that the sheets 400 stored in the sheet tray 210 are brought into contact with the sheet feed roller 507. In step S602, the main control unit 104 controls the sheet feed driving source (not illustrated) to drive the sheet feed roller 507 to rotate, so that the sheets 400 are fed from the sheet tray 210 one by one. At this time, the leading edges of the sheets 400 come into contact with a sheet separation portion 509, so that the printer 100 can separate the uppermost sheet from the sheets 400 and feed the uppermost sheet. The sheet 400 is conveyed while pushing up the sheet guide 150. When the leading edge of the sheet 400 reaches a position above the sheet detection sensor 111, the sheet 400 is further conveyed by a predetermined amount from that position, and the main control unit 104 determines that the leading edge of the sheet 400 is conveyed to a nip position between the conveyance roller 505 and the driven roller 506. When the sheet 400 is conveyed to the nip position between the conveyance roller 505 and the driven roller 506 illustrated in FIG. 4B, the conveyance roller 505 is driven to rotate by rotation of the sheet conveyance motor (not illustrated), so that the sheet 400 is further conveyed. At this time, the main control unit 104 drives the pressing plate 151 to move away from the sheet tray 210, so that the sheets 400 are separated from the sheet feed roller 507. From that point on, the main control unit 104 switches the driving source for conveying the sheet 400 to the conveyance roller 505. The main control unit 104 further drives the conveyance roller 505, so that the sheet 400 is conveyed in a direction indicated by an arrow G in FIG. 4B so as to pass between the thermal head 107 and the platen roller 504. When the sheet 400 is conveyed to a photographic printing start position illustrated in FIG. 4C, the main control unit 104 moves the thermal head 107 from the first retracted position illustrated in FIG. 4B to the second retracted position illustrated in FIG. 4C. When the thermal head 107 has been moved to the second retracted position, a ribbon drive system for rotatably driving the take-up bobbin 205 of the ink ribbon 300 is switched to be driven by a cam (not illustrated). The main control unit 104 then rotates the take-up bobbin 205 to draw the ink ribbon 300 from the supply bobbin 204 in the ink ribbon cassette 200.

In step S603, the main control unit 104 controls movement of the ink ribbon 300. More specifically, the main control unit 104 starts taking up the ink ribbon 300 first. After the start of taking up the ink ribbon 300, the main control unit 104 continues taking up the ink ribbon 300 until the marker detection sensor 113 detects the markers 311 and 312 illustrated in FIG. 3 in this order. At the time when the markers 311 and 312 are detected in this order, the main control unit 104 stops the take-up operation of the ink ribbon 300. By stopping the ink ribbon 300 at the time when the marker 312 is detected, the photographic printing start position of the Y layer 301 of the ink ribbon 300 is aligned with a position opposing the thermal head 107. In step S604, to perform desired color photographic printing, the main control unit 104 starts Y photographic printing first. More specifically, the main control unit 104 controls the driving source (not illustrated) to rotate the thermal head support arm 501 and stop the thermal head 107 at the pressing position illustrated in FIG. 4D. Accordingly, the main control unit 104 performs control so that the ink ribbon 300 and the sheet 400 are in pressure contact with each other between the thermal head 107 and the platen roller 504. In step S605, the main control unit 104 controls Y photographic printing corresponding to the target image. More specifically, while controlling the conveyance roller 505 to convey the sheet 400 in a direction indicated by an arrow F in FIG. 4D, the main control unit 104 causes the heating element of the thermal head 107 to generate heat based on a photographic print signal, thereby thermally transferring the dye of the Y layer 301 to the sheet 400. At this time, the take-up bobbin 205 is driven to rotate by the driving source (not illustrated), so that the ink ribbon 300 is conveyed in the direction indicated by the arrow F in FIG. 4D at substantially the same conveyance speed as that of the sheet 400. The ink ribbon 300 is conveyed while being in contact with a shaft 206 rotatably supported in the ink ribbon cassette 200. This reduces the conveyance resistance of the ink ribbon 300 and prevents a photographic printing failure due to wrinkles caused by defective conveyance of the ink ribbon 300. After the Y photographic printing is completed, in step S606, the main control unit 104 rotates the thermal head support arm 501 to release the pressure contact between the thermal head 107 and the platen roller 504, and stops the thermal head 107 at the second retracted position illustrated in FIG. 4C.

In step S607, to start M photographic printing, the main control unit 104 performs control to align the photographic printing start position of the M layer 302 of the ink ribbon 300 with the position opposing the thermal head 107. More specifically, the main control unit 104 rotates the take-up bobbin 205 to draw the ink ribbon 300 from the supply bobbin 204 and start taking up the ink ribbon 300. Once the marker detection sensor 113 has detected the marker 313 at the beginning of the M layer 302, the main control unit 104 performs control to stop taking up the ink ribbon 300.

In step S608, the main control unit 104 controls a return operation of the sheet 400. More specifically, the main control unit 104 controls the conveyance roller 505 to convey the sheet 400 to the photographic printing start position illustrated in FIG. 4C in the direction indicated by the arrow G in FIG. 4C. In step S609, the main control unit 104 controls the thermal head 107 to sandwich and press the ink ribbon 300 and the sheet 400 against the platen roller 504, so that the thermal head 107 is moved to the pressing position illustrated in FIG. 4D. In step S610, the main control unit 104 controls M photographic printing corresponding to the target image. In step S611, the main control unit 104 stops the thermal head 107 at the second retracted position illustrated in FIG. 4C. The processing of steps S609 to S611 is similar to that of steps S604 to S606.

Subsequently, the main control unit 104 performs the processing of steps S612 to S616 to perform C photographic printing corresponding to the target image. The main control unit 104 then performs the processing of steps S617 to S621 to perform OC photographic printing corresponding to the target image. The processing of steps S612 to S616 is similar to that of steps S607 to S611. The processing of steps S617 to S620 is similar to that of steps S607 to S610. However in step S612, to start the C photographic printing, the main control unit 104 performs control to align the photographic printing start position of the C layer 303 of the ink ribbon 300 with the position opposing the thermal head 107. More specifically, the main control unit 104 stops taking up the ink ribbon 300 once the marker detection sensor 113 has detected the marker 314 at the beginning of the C layer 303. Also in step S617, to start the OC photographic printing, the main control unit 104 performs control to align the photographic printing start position of the OC layer 304 of the ink ribbon 300 with the position opposing the thermal head 107. More specifically, the main control unit 104 stops taking up the ink ribbon 300 once the marker detection sensor 113 has detected the marker 315 at the beginning of the OC layer 304. In step S621, in the state illustrated in FIG. 4D, the main control unit 104 performs control to rotatably drive the sheet feed roller 507, nip the sheet 400 between the sheet feed roller 507 and the sheet discharge roller 508, and discharge the sheet 400 to the outside of the printer main body 130. The normal photographic print processing is thus completed.

Figure 6:
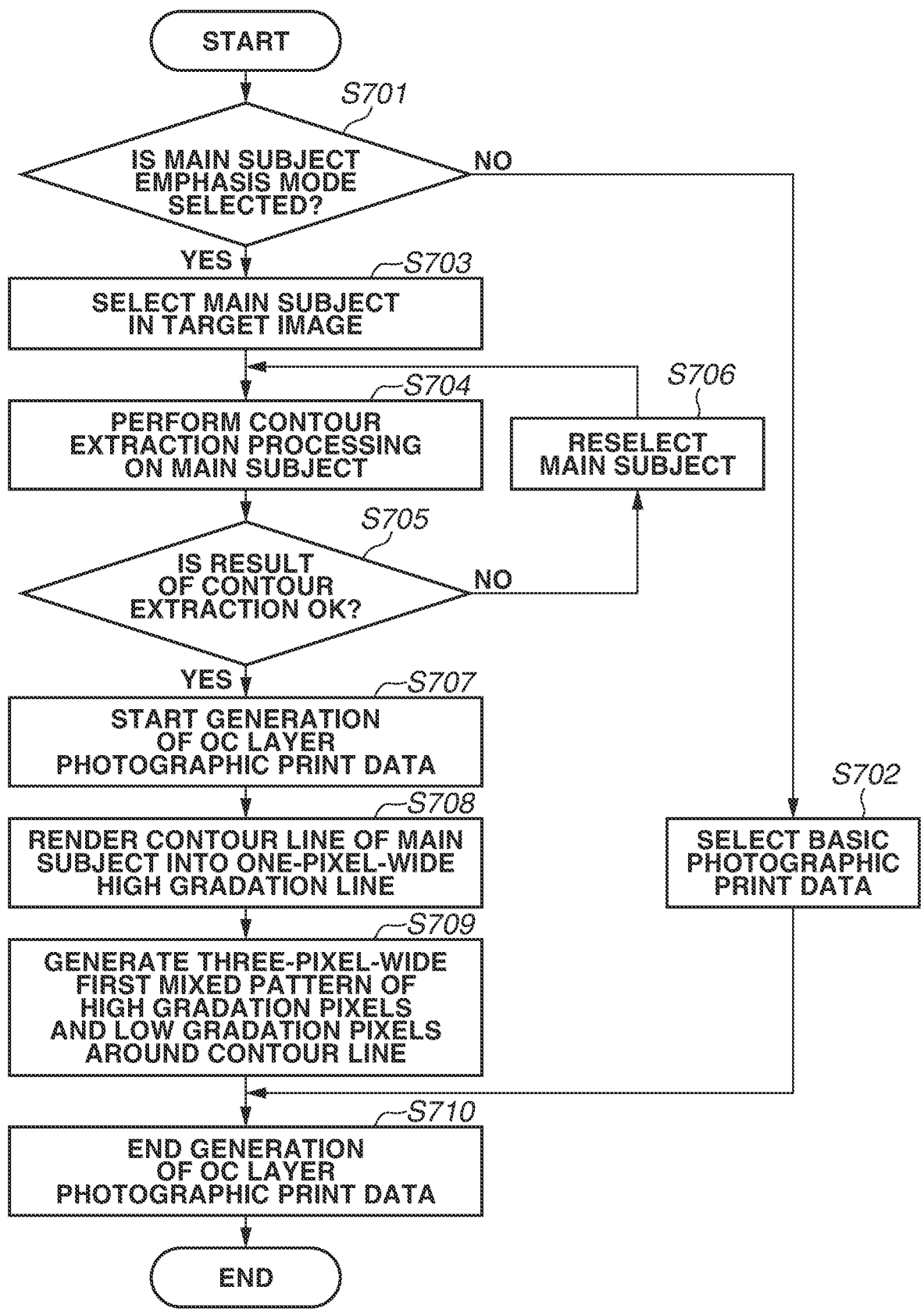
FIG. 6 is a flowchart for generating overcoat (OC) layer photographic print data according to a first embodiment.

Next, an essential part of an embodiment of the present invention will be described. More specifically, an OC layer image generation method and an OC layer photographic printing method that produce the effect of emphasizing a main subject portion in the target image according to a first embodiment of the present invention will be described with reference to FIGS. 6 to 10. FIG. 6 is a flowchart illustrating processing for generating OC layer photographic print data according to the first embodiment. First, the generation of the OC layer photographic print data will be described with reference to the flowchart of FIG. 6. The processing in this flowchart is implemented by the CPU 101 reading a program from the flash ROM 102 and controlling the components based on the read program.

In step S701, the main control unit 104 determines whether the main subject emphasis mode is selected by the user. In a case where the main subject emphasis mode is not selected (NO in step S701), the processing proceeds to step S702. In step S702, the main control unit 104 selects, for the OC layer 304, basic photographic print data for performing low gradation photographic printing uniformly over the entire area. The image processing unit 105 then generates the OC layer photographic print data in which the basic photographic print data, which is low gradation pixel data (low gradation value data) for performing the low gradation photographic printing uniformly over the entire area, is arranged over the entire area.

Figure 7:
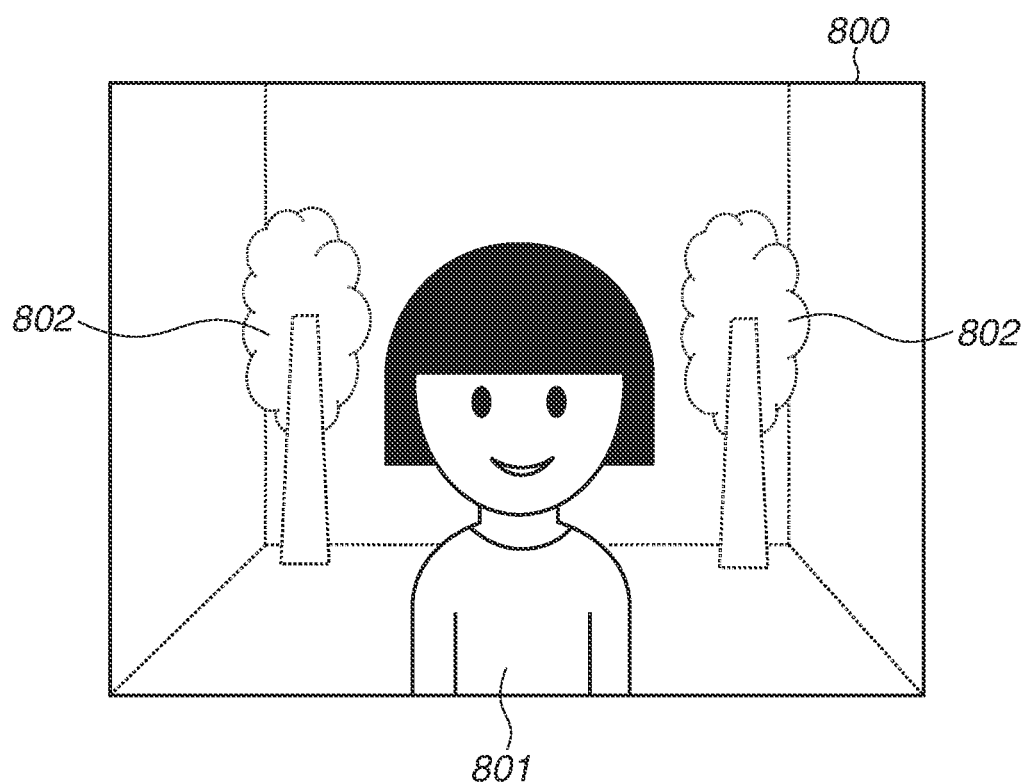
FIG. 7 is a schematic diagram illustrating original image data to be photographically printed according to the first embodiment.

On the other hand, in a case where the main subject emphasis mode is selected (YES in step S701), the processing proceeds to step S703. In step S703, the image processing unit 105 performs main subject selection processing on the target image. More specifically, at the time of transferring the OC layer 304, the main control unit 104 acquires original image data 800 (see FIG. 7) corresponding to the image to be printed on the sheet 400 using the color inks of the YMC layers 301, 302, and 303, and selects a main subject 801 (see FIG. 7) and extracts a contour of the main subject 801 from the original image data 800. FIG. 7 schematically illustrates the image of the original image data 800. The original image data 800 includes a person as the main subject 801, and trees in the background as background subjects 802. In the present embodiment, a main subject range is automatically selected based on an algorithm using face detection and contrast measurement. The selection method is not specifically limited. For example, the user may give a selection instruction via the display unit 117 and the operation unit 118.

In step S704, the image processing unit 105 performs contour extraction processing on the main subject 801 (the main subject range) in the original image data 800 that is selected in step S703. The contour extraction processing on the main subject range is performed using conventional techniques such as edge detection and human detection. In step S705, the main control unit 104 performs display control to display a result of the contour extraction processing in step S704 on the display unit 117 together with the image of the original image data 800 in a combined manner, and asks the user whether the contour of the main subject 801 is appropriately extracted. As the result of the contour extraction processing, the main control unit 104 superimposes and displays a contour line in a specific color on the image of the original image data 800. The user views the result of the contour extraction processing and performs an "OK" or "cancel" operation via the operation unit 118. In step S705, in a case where a "cancel" operation is performed (NO in step S705), the processing proceeds to step S706. In step S706, the main control unit 104 performs main subject reselection processing. At this time, the main control unit 104 may select the next candidate by using the algorithm used in selecting the main subject 801 in step S703, or may reselect a main subject by using a different algorithm. In step S705, in a case where the user views the result of the contour extraction processing and makes an "OK" operation (YES in step S705), the main control unit 104 confirms the result of the contour extraction processing in step S704, and the processing proceeds to step S707. In steps S707 to S709, the image processing unit 105 generates the OC layer photographic print data for emphasizing the main subject 801. In generating the OC layer graphical print data in steps S707 to S709, the image processing unit 105 generates the OC layer photographic print data by overwriting a partial region of the basic photographic print data (the low gradation pixels over the entire area) with high gradation pixels (high gradation value data) or mixed pattern data. For that purpose, in step S707, the image processing unit 105 prepares the basic photographic print data.

In step S708, as a first step of generating the OC layer photographic print data, the image processing unit 105 generates photographic print data by rendering a contour line corresponding to the contour of the main subject 801 extracted in step S704 into a one-pixel-wide high gradation line of high gradation pixels.

Figure 8:
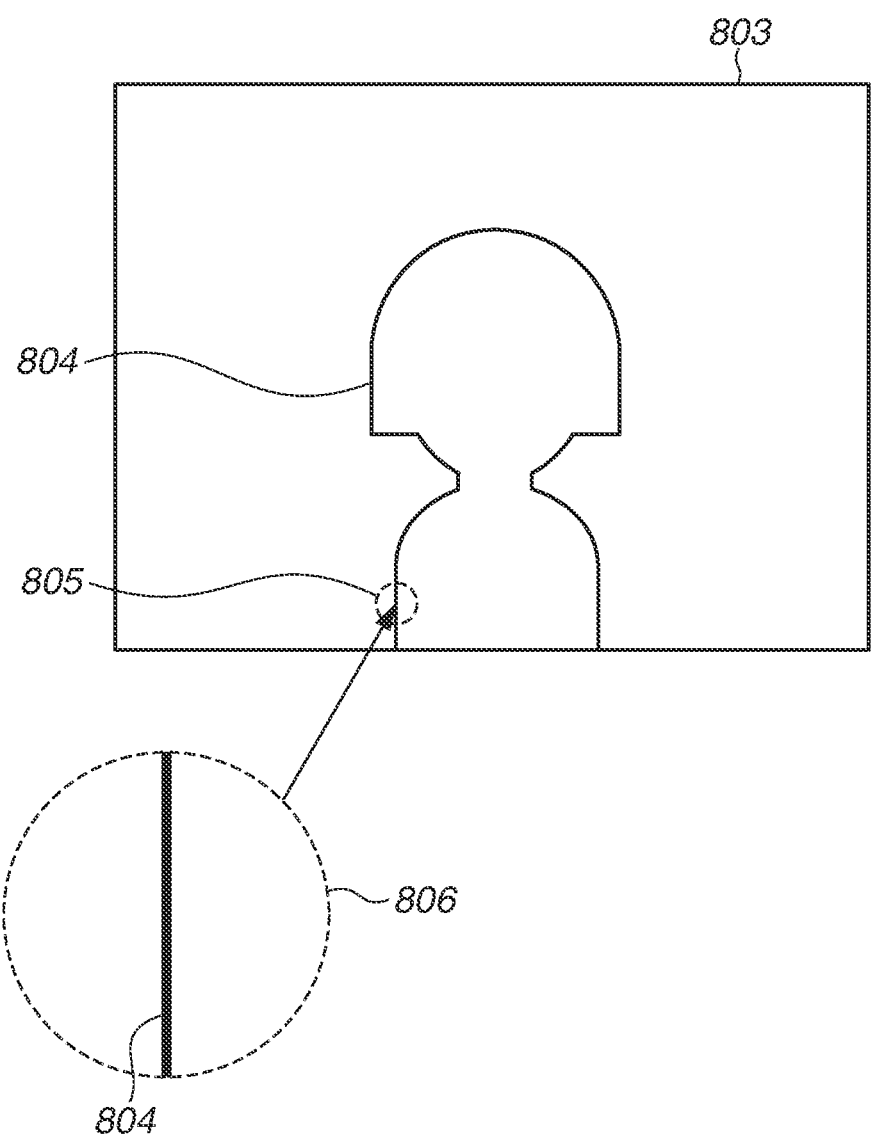
FIG. 8 is a diagram illustrating an example of OC layer photographic print data according to the first embodiment.

FIG. 8 illustrates first OC layer photographic print data 803 that is generated by rendering the contour line, which is the result of the contour extraction processing on the original image data 800, into a one-pixel-wide high gradation line. A white portion in the first OC layer photographic print data 803 corresponds to low gradation pixels (low gradation value data). A black portion (a contour line 804) in the first OC layer photographic print data 803 corresponds to high gradation pixels (high gradation value data). The first OC layer photographic print data 803 includes the high gradation pixels forming the contour line 804, and the other low gradation pixel portion. A region 806 is an enlargement of a region 805 in the first OC layer photographic print data 803. The region 806 includes the contour line 804. The contour line 804 is formed of a one-pixel-wide solid line of high gradation pixels. Low gradation pixels are assigned to the other portion. The portion printed with high gradation pixels assigned thereto has low glossiness because the surface of the protective layer is roughened by application of energy higher than melting energy. The portion printed with low gradation pixels assigned thereto has high glossiness because the melting energy for normal coating is applied. Thus, in a case where the first OC layer photographic print data 803 is photographically printed using the OC layer 304, the contour line 804 has low glossiness, whereas the other portion, i.e., the region of the main subject 801 and the background other than the contour line 804 has a high gloss surface. Since the OC layer 304 is colorless and transparent so as not to change the color tones of pictures, a visual difference between the region printed with low glossiness and the region printed with high glossiness is limited to glossiness. In other words, the contour line 804 is low in visibility. To enhance the main subject emphasis effect, the contour line 804 is to be emphasized with a certain degree of line width so that the difference in glossiness is more visible Thus, in step S709, the image processing unit 105 generates a first mixed pattern including a mixture of high gradation pixels and low gradation pixels, for an outer peripheral region as wide as three pixels from the contour line 804 generated in step S708 outside the main subject 801.

Figure 9:
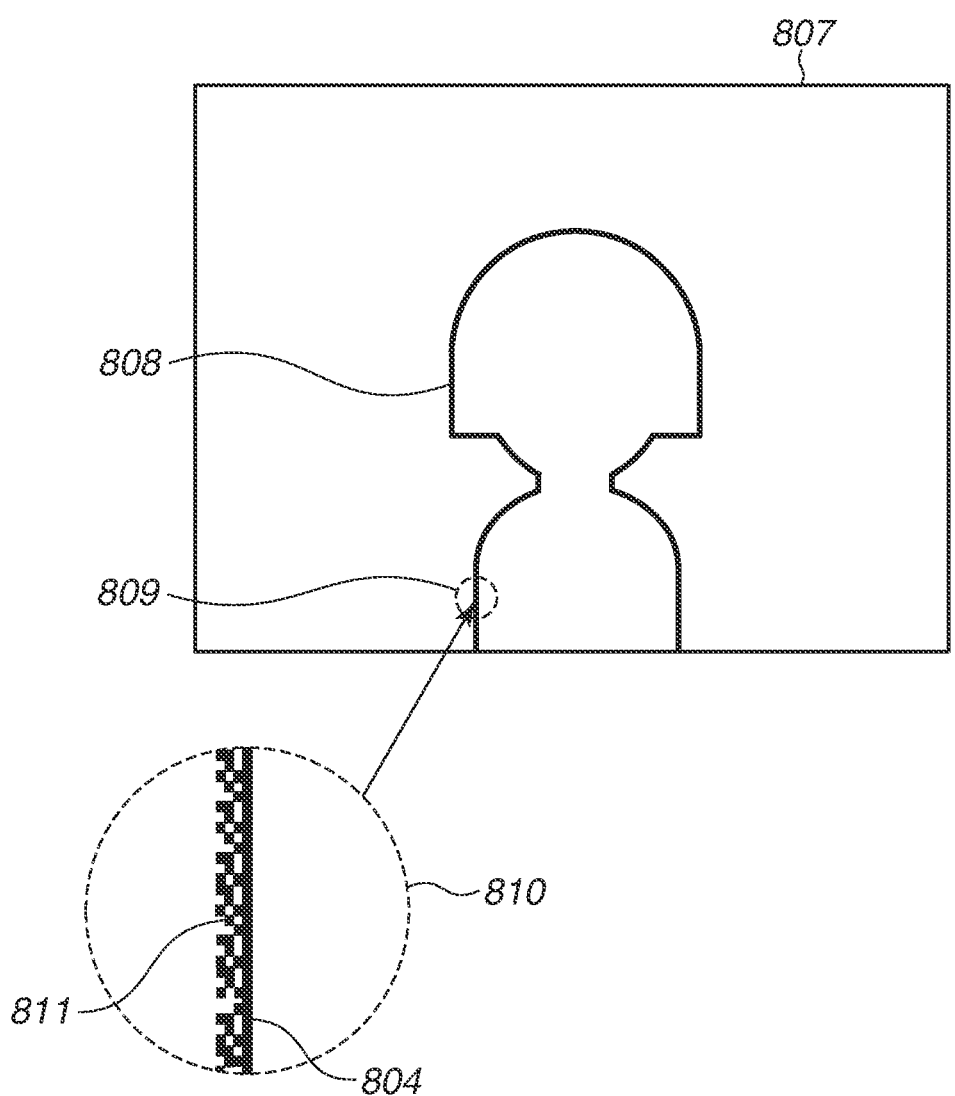
FIG. 9 is a diagram illustrating an example of OC layer photographic print data according to the first embodiment.

FIG. 9 illustrates second OC layer photographic print data 807 generated in step S709. The second OC layer photographic print data 807 is generated based on the first OC layer photographic print data 803 described with reference to FIG. 8. The second OC layer photographic print data 807 includes an enlarged contour line 808 into which the contour line 804 in the first OC layer photographic print data 803 is converted. A portion 810 is an enlargement of a portion 809 circled by a dotted line in FIG. 9. As illustrated in the portion 810, in the enlarged contour line 808, a first mixed pattern 811 is formed around the contour line 804. More specifically, the first mixed pattern 811 is formed in an outer peripheral region as wide as three pixels from the contour line 804 outside the main subject 801. The first mixed pattern 811 includes a mixture of high gradation pixel data (high gradation value data or high gradation pixels) and low gradation pixel data (low gradation value data or low gradation pixels). The enlarged contour line 808 is thus a line having a width of a total of four pixels, including the one-pixel-wide contour line 804 and the three-pixel-wide outer peripheral region. While in the present embodiment, the outer peripheral region is the three-pixel-wide region around the contour line 804, the outer peripheral region may have a width of a different number of pixels. Moreover, a size of the outer peripheral region may be changed depending on a size of the main subject 801. For example, if the main subject 801 is small (an area of the main subject 801 is less than a predetermined value), a region as wide as three pixels from the contour line 804 may be set as the outer peripheral region. If the main subject 801 is large (the area of the main subject 801 is greater than or equal to the predetermined value), a region as wide as six pixels from the contour line 804 may be set as the outer peripheral region.

The first mixed pattern 811 is generated using an algorithm in which more than two high gradation pixels are not continuous, i.e., three or more high gradation pixels are not continuous. The printer 100 according to the present embodiment includes the thermal head 107 having a resolution of 300 dots per inch (dpi) that is commonly used in a thermal transfer printer for picture printing. Two pixels correspond to a photographic printing distance of 0.17 mm. If high gradation pixels are continuous for a distance of 0.5 mm or more in the main scan direction or sub scan direction of the printer 100, a defect such as a separation failure or abnormal noise can occur. Thickening the contour line 804 with the first mixed pattern 811 generated using the foregoing algorithm prevents the occurrence of a defect such as a separation failure and abnormal noise.

The first mixed pattern 811 including a mixture of high gradation pixels and low gradation pixels has a low apparent reflectance (glossiness) because the printed surfaces of the dispersed high gradation pixel portions are roughened, compared to the portion printed with low gradation pixels. Accordingly, the contour line 804 and the first mixed pattern 811 can be visually observed as an integrated line. After completion of the processing for generating the enlarged contour line 808 in step S709, then in step S710, the image processing unit 105 ends the generation of the OC layer photographic print data. The generated second OC layer photographic print data 807 is used in the OC photographic print processing of step S620 in the flowchart illustrating the normal photographic print processing described with reference to FIG. 5, so that the photographic printing using the OC layer 304 is performed.

Figure 10:
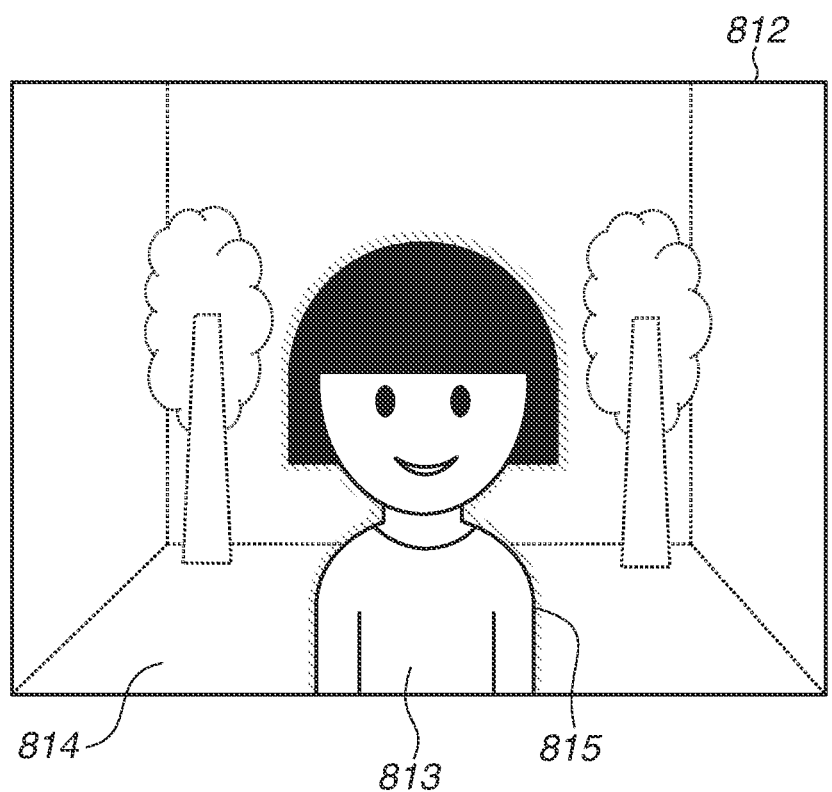
FIG. 10 is a schematic diagram illustrating an appearance of a photographic printout according to the first embodiment.

FIG. 10 schematically illustrates a photographic printout 812 printed based on the original image data 800 and the second OC layer photographic print data 807. The photographic printout 812 includes a main subject portion 813 that has a glossy surface coated by normal OC processing (OC layer transfer with low gradation value data). On the other hand, a contour line of the main subject portion 813 has low glossiness because of OC layer transfer with high gradation value data. For an outer peripheral region around the contour line, the OC layer 304 is transferred by using the first mixed pattern 811 including a mixture of low gradation values and high gradation values, so that the outer peripheral region forms a low gloss portion 815 that has higher glossiness than the contour line and lower glossiness than the main subject portion 813 coated by the normal OC processing. For a background region 814 outside the outer peripheral region (which is a region other than the subject region, the contour line, and the outer peripheral region), the OC layer 304 is transferred by the normal OC processing. As described above, the photographic printout 812 emphasizing the main subject portion 813 is achieved by expressing a difference in glossiness in the contour portion of the main subject portion 813.

In other words, the boundary of the main subject region can be clearly emphasized by transferring the OC layer so that the main subject region has high glossiness and the contour line of the main subject has high gradation and low glossiness. Moreover, the first mixed pattern 811 is used to transfer the OC layer 304 to the outer peripheral region of the main subject. This provides a less glossy, matte surface finish, making it possible to output a printout with an emphasized bokeh effect.

Next, a second embodiment of the present invention will be described with reference to FIGS. 11 to 13. The second embodiment is different from the first embodiment in generation of OC layer photographic print data. Since the configuration of the printer 100 and the normal photographic print processing are the same as those in the first embodiment, a description thereof will be omitted.

Figure 11:
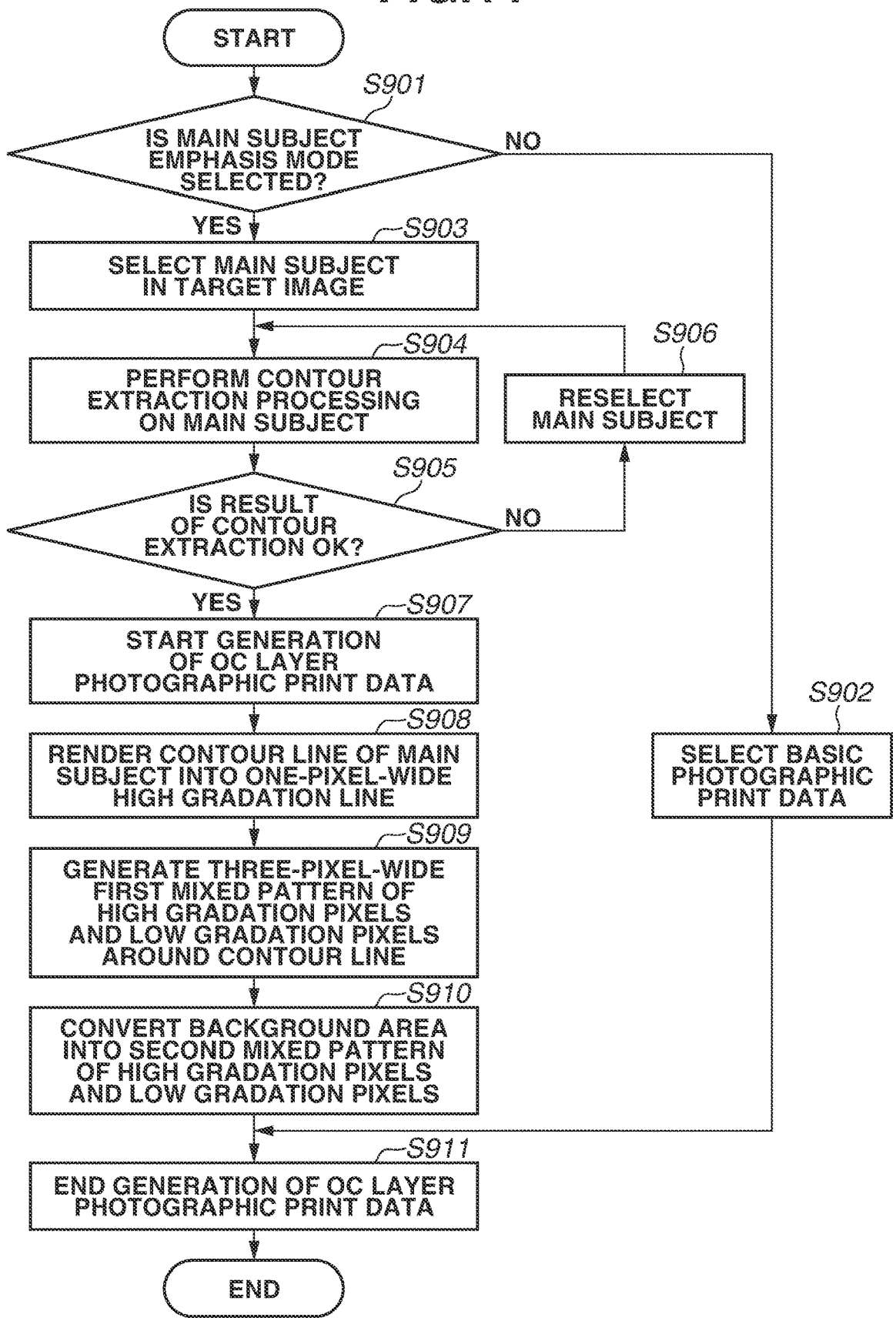
FIG. 11 is a flowchart for generating OC layer photographic print data according to a second embodiment.

FIG. 11 is a flowchart illustrating processing for generating OC layer photographic print data according to the second embodiment. First, the generation of the OC layer photographic print data will be described with reference to the flowchart of FIG. 11. Similarly to the processing in the flowchart of FIG. 6, the processing in this flowchart is implemented by the CPU 101 reading a program from the flash ROM 102 and controlling the components based on the read program.

The processing of steps S901 to S909 is similar to that of steps S701 to S709 in the flowchart for generating the OC layer photographic pint data in FIG. 6 according to the first embodiment. A description thereof will thus be omitted.

In the present embodiment, in step S910, the image processing unit 105 converts a background region, which is outside the first mixed pattern 811 in the outer peripheral region of the contour line 804 in the second OC layer photographic print image data 807 generated in step S909, into a second mixed pattern including a mixture of high gradation pixels and low gradation pixels. In the present embodiment, the background region refers to the region other than the main subject region and the enlarged contour line 808 (including the contour line 804 and the outer peripheral region of the contour line 804).

Figure 12:
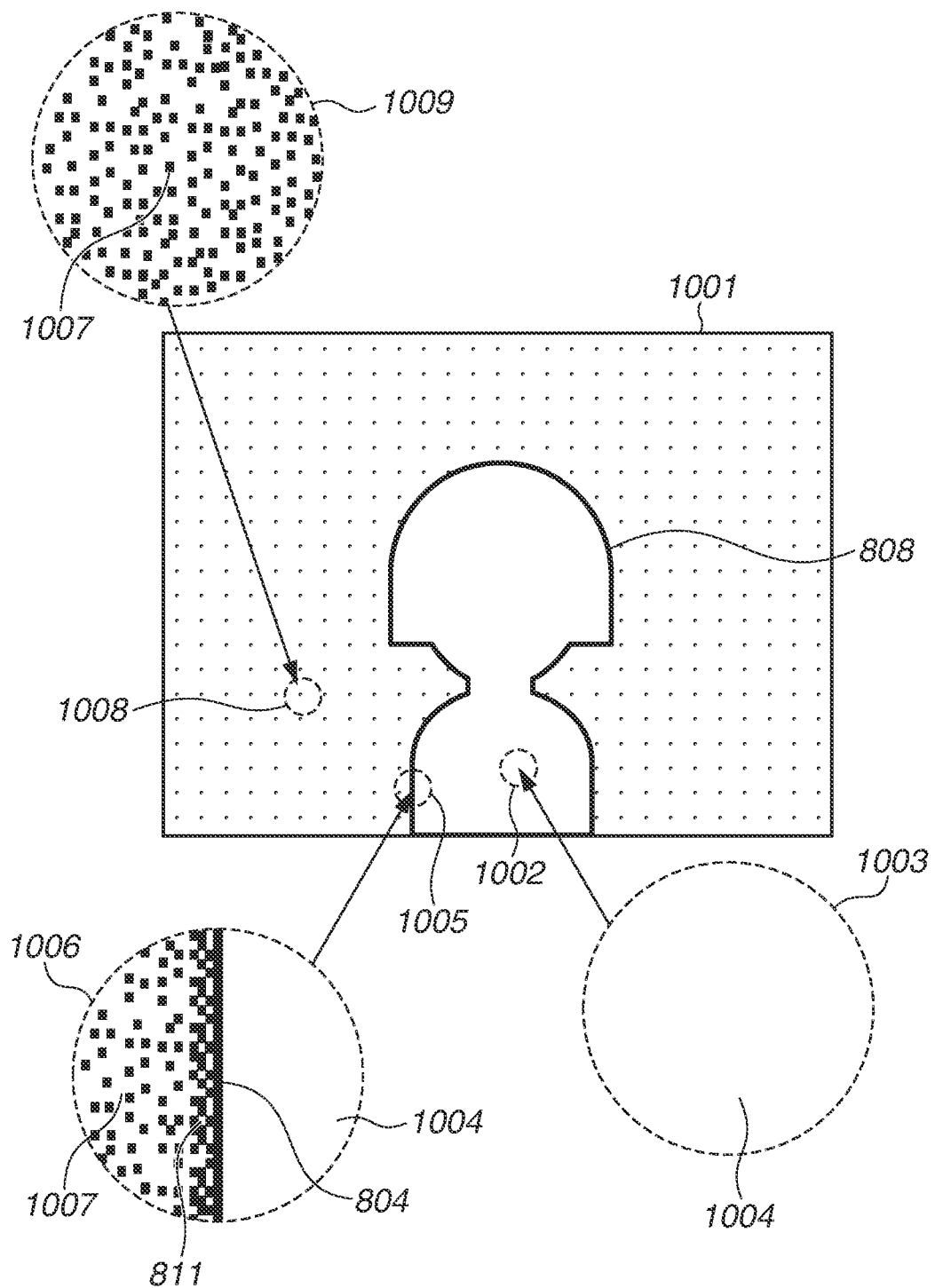
FIG. 12 is a diagram illustrating an example of OC layer photographic print data according to the second embodiment.

FIG. 12 illustrates third OC layer photographic print data 1001 generated in step S909. The third OC layer photographic print data 1001 is generated based on the second OC layer photographic print data 807 described with reference to FIG. 9. An enlarged portion 1003 is an enlargement of a partial region 1002 of a main subject region in the third OC layer photographic print data 1001 in FIG. 12. An inside region 1004 of the enlarged portion 1003 includes low gradation pixels and does not include high gradation pixels. A portion 1006 is an enlargement of a partial region 1005 that circles a part of the enlarged contour line 808 (including the contour line 804 and the outer peripheral region) with a dotted line in FIG. 12. As illustrated in the portion 1006, the enlarged contour line 808 includes the contour line 804 and the outer peripheral region around the contour line 804 that are formed adjacent each other. The contour line 804 is a one-pixel-wide line of high gradation pixels. The outer peripheral region is formed of the first mixed pattern 811 including a mixture of high gradation pixel data and low gradation pixel data. The third OC layer photographic print data 1001 further includes a second mixed pattern 1007 that forms the background region outside the outer peripheral region. The second mixed pattern 1007 is a pattern including a mixture of high gradation pixel data and low gradation pixel data, but the proportion of high gradation pixels in the second mixed pattern 1007 is lower than that in the first mixed pattern 811. A region 1009 is an enlargement of a part 1008 of the background region in the third OC layer photographic print data 1001 illustrated in FIG. 12. An inside of the region 1009 is formed of the second mixed pattern 1007. The density of high gradation pixels (the proportion of high gradation pixels) in the second mixed pattern 1007 is set to be lower than that in the first mixed pattern 811. After the setting of the second mixed pattern 1007, in step S911, the generation of the OC layer photographic print data according to the present embodiment ends. The third OC layer photographic print data 1001 generated in this manner is used in the OC photographic print processing in step S620 of the flowchart illustrating the normal photographic print processing described with reference to FIG. 5, so that the photographic printing using the OC layer 304 is performed.

Figure 13:
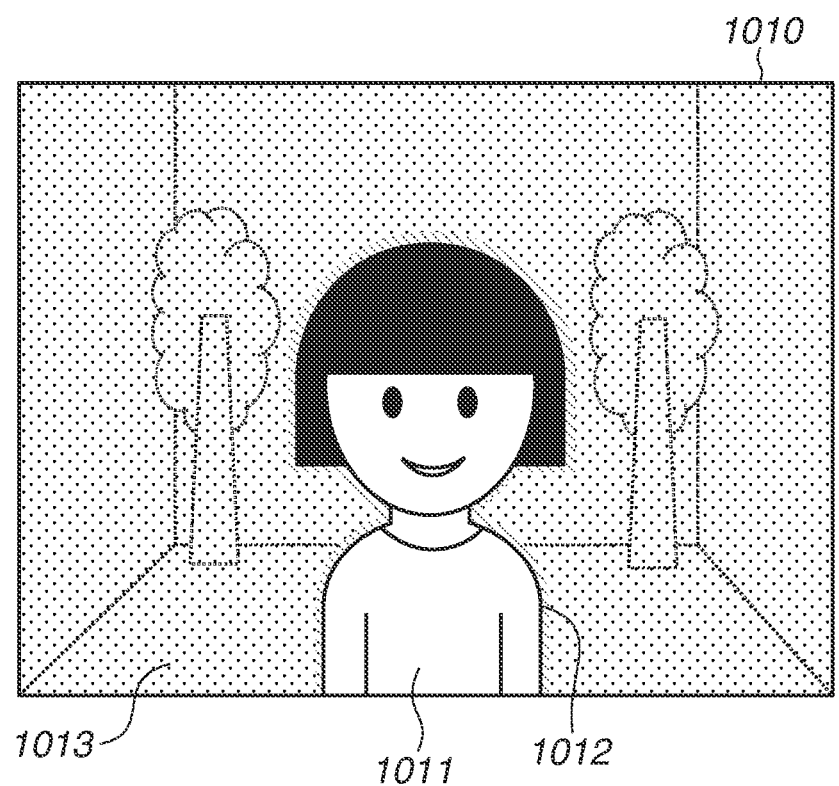
FIG. 13 is a schematic diagram illustrating an appearance of a photographic printout according to the second embodiment.

FIG. 13 schematically illustrates a photographic printout 1010 printed based on the original image data 800 and the third OC layer photographic print data 1001. The photographic printout 1010 includes a main subject portion 1011 that has a high gloss surface coated by the normal OC processing (the OC layer transfer with low gradation value data). On the other hand, a contour line of the main subject portion 1011 has low glossiness because of the OC layer transfer with high gradation value data. For an outer peripheral region around the contour line, the OS layer 304 is transferred by using the first mixed pattern 811 including a mixture of low gradation values and high gradation values, so that the outer peripheral region forms a low gloss portion 1012 that has higher glossiness than the contour line and lower glossiness than the main subject portion 1011 coated by the normal OC processing. A background region outside the outer peripheral region forms a semi-glossy portion 1013 that has slightly higher glossiness than the low gloss portion 1012 because the OC layer 304 is transferred using the second mixed pattern 1007 where the proportion of high gradation pixels is lower than that in the first mixed pattern 811. As described above, an effect of further emphasizing the main subject can be achieved by making the surface reflectance of the main subject and that of the background region different while emphasizing the contour portion.

In the foregoing embodiments, the image processing unit 105 may be configured to perform face detection processing, and may generate OC layer photographic print data by selecting a person with a face detected by the face detection processing as a main subject and detecting a contour of the person with the detected face.

Each of the first mixed pattern 811 and the second mixed pattern 1007 may have a change within the pattern. For example, the density (the proportion) of high gradation pixels may be reduced with increasing distance from the contour line. The gradation values of high gradation pixels may be made variable to change the magnitude of the emphasizing effect.

In the second embodiment, the entire background is formed of the second mixed pattern 1007 as the background region. Alternatively, a region within a predetermined range from the contour line of the main subject (a region greater than the outer peripheral region) may be formed of the second mixed pattern 1007 as the background region, and a background portion farther from the main subject may be formed of low gradation pixels.

While the main subject in a picture has been described as the target to be emphasized, the foregoing embodiments are also applicable to a specific image range, in artificially generated image data, where contour extraction can be performed. While in the foregoing embodiments, a printer that is a printing apparatus has been described as an example, the foregoing embodiments may be implemented in a printing system where a printer and a print control apparatus such as a personal computer (PC) are connected to each other. In this case, the normal photographic print processing illustrated in FIG. 5 is performed by the printing apparatus, the processing for generating the OC layer photographic print data illustrated in FIG. 6 or FIG. 11 is performed by the print control apparatus, and the generated OC layer photographic print data is transmitted to the printing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is defined by the scope of the following.

This application claims the benefit of Japanese Patent Application No. 2021-053342, filed Mar. 26, 2021, which is hereby incorporated by reference herein in its entirety.

What is claimed is:

1. A print control apparatus for transferring transparent protective ink onto an image printed on a substrate, the print control apparatus comprising:
    a memory and at least one processor which function as:
    an extraction unit configured to extract a contour of a subject in the image; and
    a control unit configured to generate print data for transferring the protective ink using a printing apparatus, based on the extracted contour of the subject,
    wherein the control unit is configured to generate the print data by assigning a high gradation value to a contour line corresponding to the extracted contour of the subject, assigning a low gradation value to a region corresponding to the subject, and assigning a mixture of the high gradation value and the low gradation value to an outer peripheral region of the subject.

2. The print control apparatus according to claim 1, wherein the outer peripheral region of the subject is a region having a width of a predetermined number of pixels from the contour line.

3. The print control apparatus according to claim 2, wherein the predetermined number of pixels varies depending on a size of the subject.

4. The print control apparatus according to claim 1, wherein the control unit is configured to generate the print data by using, for the outer peripheral region of the subject, a first mixed pattern including a mixture of high gradation pixels and low gradation pixels.

5. The print control apparatus according to claim 4, wherein the first mixed pattern is a mixed pattern in which three or more high gradation pixels are arranged not to be continuous.

6. The print control apparatus according to claim 4, wherein the first mixed pattern is a mixed pattern in which a density of high gradation pixels decreases with increasing distance from the contour line.

7. The print control apparatus according to claim 4, wherein the first mixed pattern is a pattern used to transfer the protective ink to provide lower glossiness than a case of using the low gradation value to transfer the protective ink and higher glossiness than a case of using the high gradation value to transfer the protective ink.

8. The print control apparatus according to claim 4, wherein the control unit is configured to generate the print data by using, for a background region outside the outer peripheral region of the subject, a second mixed pattern including a mixture of high gradation pixels and low gradation pixels, and wherein a proportion of the high gradation pixels in the second mixed pattern is lower than a proportion of the high gradation pixels in the first mixed pattern.

9. The print control apparatus according to claim 1, wherein the extraction unit is configured to extract the contour of the subject based on image data of the image printed on the sheet.

10. The print control apparatus according to claim 9, wherein the extraction unit is configured to extract the contour of a main subject included in the image.

11. The print control apparatus according to claim 9, wherein the extraction unit is configured to detect a face from the image data and extract the contour of the subject based on the detected face.

12. The print control apparatus according to claim 1, wherein the low gradation value is a gradation value for transferring the protective ink to provide high glossiness, and wherein the high gradation value is a gradation value for transferring the protective ink to provide low glossiness.

13. The print control apparatus according to claim 1, further comprising the printing apparatus.

14. A print control method for transferring transparent protective ink, using a printing apparatus, onto an image printed on a substrate, the print control method comprising:

extracting a contour of a subject in the image; and controlling generation of print data for transferring the protective ink using the printing apparatus, based on the extracted contour of the subject, wherein the print data is generated by assigning a high gradation value to a contour line corresponding to the extracted contour of the subject, assigning a low gradation value to a region corresponding to the subject, and assigning a mixture of the high gradation value and the low gradation value to an outer peripheral region of the subject.

15. A non-transitory computer-readable storage medium for causing a computer to perform the print control method according to claim 14.

* * * * *